United States Patent [19]
Fulcher et al.

[11] Patent Number: 5,948,562
[45] Date of Patent: Sep. 7, 1999

[54] ENERGY STORAGE DEVICE

[75] Inventors: Michael Fulcher, Lawrenceville; Paul Gies, Atlanta; Steven L. Hassenzahl, Lilburn, all of Ga.

[73] Assignee: Motorola, Inc., Schaumburg, Ill.

[21] Appl. No.: 08/963,324

[22] Filed: Nov. 3, 1997

[51] Int. Cl.⁶ ........................................... H01M 2/06
[52] U.S. Cl. .................. 429/181; 429/162; 429/184; 429/185; 429/211
[58] Field of Search ..................... 429/162, 181, 429/184, 185, 211

[56] References Cited

U.S. PATENT DOCUMENTS

| | | | |
|---|---|---|---|
| 4,278,744 | 7/1981 | Athearn | 429/181 |
| 5,227,264 | 7/1993 | Duval et al. | 429/153 |
| 5,650,243 | 7/1997 | Ferment | 429/162 |

*Primary Examiner*—Maria Nuzzolillo
*Assistant Examiner*—Angela J. Martin
*Attorney, Agent, or Firm*—Felipe J. Farley

[57] ABSTRACT

A metal foil laminate package for an electrochemical cell has a multilayered structure (32, 34) comprising a metal foil (40) sandwiched between layers of a thermoplastic (38) and a heat-sealable polymer (42). An electrically conducting tab (28) extends from the cell and has a layer of insulative tape (29) disposed on both sides of the tab. Apertures (50,52,60, 62) formed through the various layers of the package expose both sides of the tab, providing sites for subsequent welding of the tab to external circuitry.

12 Claims, 4 Drawing Sheets

ENERGY STORAGE DEVICE

CROSS REFERENCE TO RELATED APPLICATIONS

This application is related to pending U.S. application Ser. No. 08/901,858, filed Jul. 29, 1997, by Reichart et al., entitled "FOIL LAMINATE PACKAGE FOR ELECTROCHEMICAL CELLS," and assigned to Motorola, Inc.

TECHNICAL FIELD

This invention relates in general to the field of electrochemical cells, and more particularly to electrochemical cells packaged in flexible foil laminate packages.

BACKGROUND

There has been a great deal of interest in developing better and more efficient methods for storing energy for applications, such as cellular communication, satellites, portable computers, and electric vehicles to name but a few. Accordingly, there have been recent concerted efforts to develop high energy, cost effective batteries having improved performance characteristics and a variety of form factors.

In an effort to lessen the weight of battery cells, such as rechargeable electrochemical cells, while providing more flexible form factors, battery manufacturers have shown increasing interest in lithium ion polymer electrochemical cells. In lithium ion polymer technology, the bonding of the electrodes, (the anode and the cathode) to the separator eliminates the need for rigid cell cans. Accordingly, lithium ion polymer cells may be packaged in thin, flexible, multilayered packaging. This multilayered packaging typically includes at least one layer of a thin metal foil, such as aluminum, to provide an oxygen and moisture barrier. The foil layer is then typically encapsulated between a sheet of a mechanically robust outer polymer material, such as nylon or polyester, and a layer of a low melting temperature polyolefin for heat sealing. These metal foil laminates are very common in everyday usage, having applications in the pharmaceutical and food packaging industries.

There are a number of problems which are prevalent when this type of foil laminate packaging is applied to battery applications. Each problem is related to current conducting metallic tabs which pass from the interior of the cell package to the outside in order to electrically couple the battery cell to an application device. For instance, package delamination commonly occurs as a result of insufficient bonding between package heat sealing layers and the metallic surface of the tabs. Furthermore, insufficient tab thickness commonly results in low tab strength. Restrictions on tab thickness (generally to 2–3 mils) are a product of the foil laminate structure, i.e., tab thickness is restricted to allow the heat seal layer to flow around the tabs to produce a hermetic seal. Finally, unintentional electrical shorting between individual tabs and between the tabs and the metal foil laminate, although not as significant a problem as the aforementioned problems, remains a concern to be addressed.

One novel foil laminate packaging structure for electrochemical cells, disclosed in commonly-assigned U.S. patent application Ser. No. 08/901,858, incorporates a modified polyolefin adhesion-promoting material which provides improved delamination protection and increased tab strength. Despite the associated improvements in delamination resistance and tab strength, these issues remains a concern and there is a constant effort to further improve the design of such foil laminate packages. Therefore, it would be desirable to provide a modified foil laminate structure which further improves the mechanical integrity of the package.

Accordingly, there exists a need to provide a better structure for packaging electrochemical cells, such as lithium ion polymer cells. The packaging scheme should provide a tab structure which provides better tabs strength, reduced delamination, and reduces or eliminates tab shorting.

DETAILED DESCRIPTION OF THE PREFERRED EMBODIMENT

Figure 1:
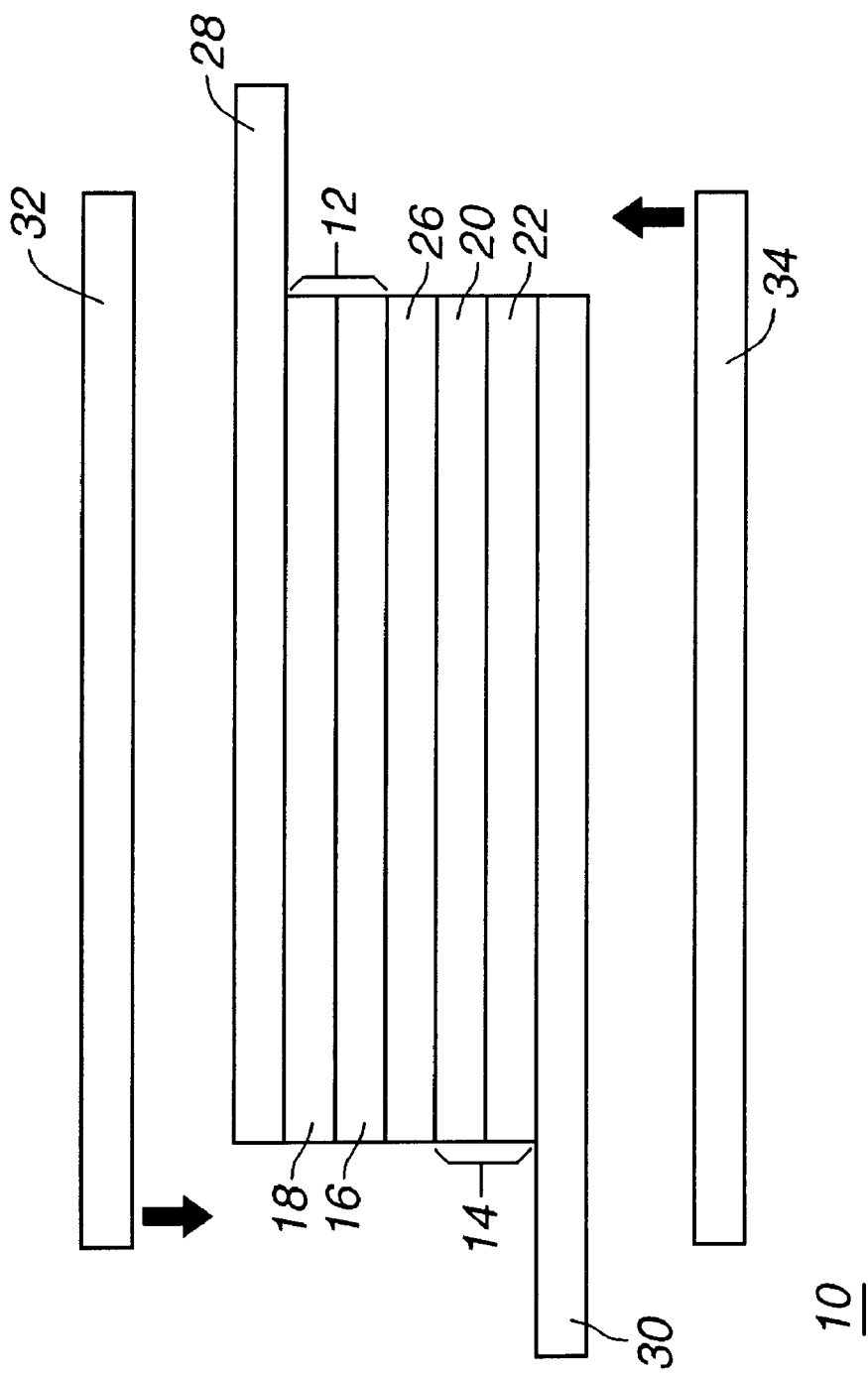
FIG. 1 is a side view of an electrochemical cell in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a side view of an electrochemical cell in accordance with the instant invention. The cell 10 includes first and second electrodes 12 and 14, respectively. The first electrode 12 can be, for example, an anode in a lithium rechargeable cell. Accordingly, the anode may be fabricated of any of a number of different known materials for lithium rechargeable cells, examples of which include metallic lithium, lithium alloys, and lithium intercalation materials such as carbon, petroleum coke, activated carbon, graphite, and other forms of carbon known in the art. In one preferred embodiment, the anode 12 is fabricated of an amorphous carbonaceous material such as that disclosed in U.S. Pat. No. 5,647,963 issued on Jul. 15, 1997 to Zhang et al. for "Electrode Materials for Electrochemical Cells and Method for Making Same", assigned to Motorola, Inc., the disclosure of which is hereby incorporated by reference.

More particularly, the anode 12 comprises a layer of active material 16, such as a carbon material as described hereinabove, deposited on a substrate 18. Substrate 18 can be any of a number of materials known in the art, examples of which include copper, gold, nickel, copper alloys, copper plated materials, and combinations thereof. In the embodiment of FIG. 1, the substrate 18 is fabricated of copper.

The second electrode 14 can be adapted to be the cathode of a lithium rechargeable cell. In such an instance, the cathode is preferably fabricated of a lithium intercalation material, examples of which include lithiated manganese oxide, lithiated cobalt oxide, lithiated nickel oxide, and combinations thereof. In one preferred embodiment, the cathode 14 is fabricated of a lithiated nickel oxide material such as is disclosed in commonly assigned U.S. Pat. No. 5,591,548 issued on Jan. 7, 1997 to Mao for "Positive Electrode Materials for Rechargeable Electrochemical Cells and Method of Making Same", the disclosure of which is hereby incorporated by reference.

More particularly, the cathode 14 comprises a layer of the cathode active material 20 disposed on a cathode substrate 22. The cathode material 20 may be such as that described hereinabove, while the substrate 22 may be fabricated from any of a number of known materials known in the art, examples of which include aluminum, nickel, and combinations thereof. In one preferred embodiment, substrate 22 is fabricated of aluminum.

Disposed between electrodes 12 and 14 is a layer of an electrolyte system 26. The electrolyte system 26 preferably comprises an electrolyte active species and a polymer gel electrolyte support structure consisting of at least one or more different polymers. For example, a first polymer may be provided as an absorbing phase, and the second polymer may be provided as an inert phase. The inert phase may primarily provide mechanical integrity and structural rigidity to the electrolyte system, while the absorbing phase, which can be disposed on either or both sides of the inert phase, is primarily adapted to engage the electrolyte active species therein. The absorbing phase is preferably a gelling polymer and can further act as a bonding paste to assist in adhering the electrodes to the electrolyte system as described below.

The electrolyte active species is a liquid or solid component (or both) which provides ionic conductivity between the anode 12 and the cathode 14. In the embodiment in which the electrochemical cell 10 is a lithium intercalation cell, the electrolyte active species consists of an alkali metal salt in a solvent. Typical alkali metal salts include, but are not limited to, salts having the formula $M^+X^-$, where $M^+$ is an alkali metal cation such as $Li^+$, $Na^+$, $K^+$, and combinations thereof, and where $X^{31}$ is an anion such as $Cl^-$, $Br^-$, $I^-$, $ClO_4^-$, $BF_4^-$, $PF_6^-$, $AsF_6^-$, $SbF_6^-$, $CH_3CO_2^-$, $CF_3SO_3^-$, $N(CF_3SO_2)_2^-$, $C(CF_3SO_2)_3^-$, and combinations thereof. The solvent into which the salt is dispersed is typically an organic solvent including, but not limited to, propylene carbonate (PC), ethylene carbonate (EC), diethyl carbonate (DEC), dimethyl carbonate (DMC), dipropylcarbonate, dimethylsulfoxide, acetonitrile, dimethoxyethane, tetrahydrofuran, n-methyl-2-pyrrolidone (NMP), methyl ethyl ketone (MEK), acetone, and combinations thereof. For other electrode combinations, e.g., Ni-Cd or Ni-metal hydride, other electrolyte active species may be used, such as KOH. An electrolyte system such as that described hereinabove is described in greater detail in commonly assigned U.S. Pat. No. 5,639,573 issued on Jun. 17, 1997 to Oliver et al. for "Polymer Gel Electrolyte", the disclosure of which is hereby incorporated by reference.

Operatively connected and electrically coupled to said electrically conducting substrates 18 and 22 are first and second electrically conducting tabs 28 and 30. The function of tabs 28 and 30 is to conduct current generated in the electrodes 12 and 14 to an application device, for example, a two-way radio device, and to recharge the cell. As such, the tabs 28 and 30 are generally fabricated of a metallic material, examples of which include stainless steel, iron, nickel, silver, aluminum, copper, and combinations thereof.

While the instant invention is described herein as part of a lithium rechargeable electrochemical cell, it should be understood that it is not so limited. The electrolyte system and methods of fabrication are applicable to a host of different electrochemical systems, such as electrochromic devices, fuel cells, capacitors, and other types of energy storage systems, to name a few. Furthermore, the cell structure can differ from that shown in FIG. 1. By way of example, the cell 10 could comprise multiple anode 12, cathode 14, and electrolyte 26 layers to essentially form several battery cells within a single battery package. Alternatively, the cell 10 need not comprise stacked layers at all; instead, the electrode and electrolyte layers could be wound into a conventional "jelly roll" configuration in which tabs 28 and 30 extend from rolled electrodes.

The entire electrochemical charge storage device 10 is then packaged so that it is enclosed between first and second sheets of a metal foil laminate material 32 and 34. Alternatively, the device 10 may be enclosed between first and second portions of a single sheet of a metal foil laminate. More particularly, the entire device 10, including the metallic tabs 28, 30, is enclosed in the metal foil laminate. It is important to understand that in order to ensure continued operation of the device, the enclosing laminate should provide a moisture and vapor barrier for the device, since moisture and oxygen will degrade the performance of many types of electrochemical devices. Therefore, the seal between the first and second sheets of the laminate, particularly around the tab region, should be hermetic. The seal and the elements which contribute to its hermetic nature will be discussed in greater detail hereinbelow.

It will be appreciated that the use of the term "sheets" is not intended to be restrictive, since the packaging of the cell 10 according to the present invention can be accomplished using any form factor of metal foil laminate material. For instance, a form-fill-seal automated packaging scheme could be used in which the bottom portion of the packaging is formed into a cup-like shape into which the cell 10 is placed. The top portion, which could also be formed, is then heat sealed onto the bottom portion to form the sealed package.

Figure 2:
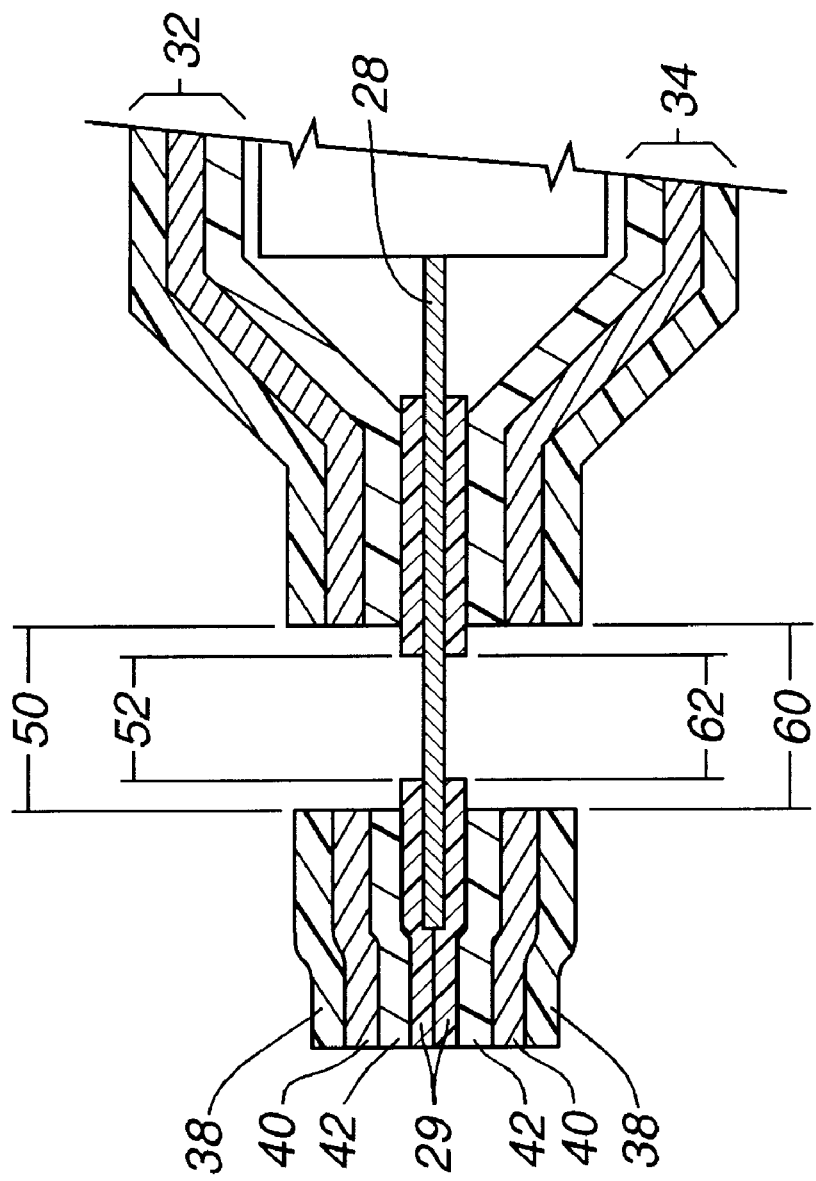
FIG. 2 is a partial section view of an electrochemical cell as depicted in FIG. 1, having an improved tab structure, in accordance with the present invention.

Referring now to FIG. 2, there is illustrated a side view of the electrochemical cell of FIG. 1 after sealing in a package. In particular, FIG. 2 illustrates that the metal foil laminate layers 32 and 34 (FIG. 1) that enclose the cell 10 can, in fact, be multilayered laminate structures, e.g., including three (3) layers. In the tri-layered structure of FIG. 2, both layers 32 and 34 may include a first layer of a mechanically rugged or robust thermoplastic material 38, such as nylon, polyester, polypropylene, and combinations thereof. The purpose of layer 38 is to provide strength and tear resistance for the foil laminate material. Accordingly, a host of other materials well known to those of ordinary skill in the art can also be used.

Disposed adjacent the thermoplastic layer 38 is a layer of a metal foil 40 that provides moisture and vapor barrier properties for the reasons described above. Accordingly, the metal foil layer 40 may be fabricated of a metal foil selected from the group of aluminum, copper, nickel, and combinations thereof.

Thereafter, disposed adjacent the metal foil layer 40 is a layer of a heat-sealable polymer material 42. The purpose of the heat sealable polymer 42 is to allow the two layers 32, 34 of metal foil laminate to be sealably closed together upon, for example, the application of heat. Due to the preferred heating regimes of the instant electrochemical device, the heat sealable polymer 42 is heat sealable at temperatures in the range of between 110 to 180° C., and preferably in the range of 120 to 170° C. Accordingly, the heat sealable plastic 42 is selected from the group of materials consisting of polypropylene, polyethylene, polyester, polyamides, and combinations thereof.

It is to be understood that while FIG. 2 illustrates the multilayered metal foil laminates 32 and 34 as each having the same three sub-layers, the invention is not so limited. Either or both layers may have more or less sub-layers, made up of the same or different materials. For example, either or both layers 32, 34 could be fabricated of a single layer of material that provides the same functionality of the tri-layer structure described above.

Still referring to FIG. 2, a layer of insulating adhesive tape 29 is provided on the opposing major surfaces of metallic tab 28. The same structure is provided for each metallic tab; however, for illustrative purposes, only tab 28 is shown. The insulative tape is preferably constructed from a modified polyolefin material similar to that used to seal the periphery of multilayered foil laminates 32 and 34. The modified polyolefin should preferably have a sealing/melting temperature in the range of between 110–180° C., and preferably between 120–170° C. Accordingly, preferred materials from which to fabricate the insulative tape 29 include polypropylene-maleic anhydride copolymer, polypropylene-ethylene acrylic acid copolymer, polyester, and combinations thereof. Some specific examples are Unite®, which is a polypropylene-maleic anhydride copolymer fabricated by Aristech; Thermo-Bond Film 845, which is a modified polypropylene by 3M; and Thermo-Bond Film 667, which is a polyester thermoplastic by 3M.

Metal foil laminate layer 32 and tape layer 29 have concentric apertures which, together, expose the surface of tab member 28 for subsequent welding, e.g., resistance welding of the tab member to external circuitry. In an effort to preclude electrical shorting between the tab member 28 and metal foil sublayer 40 of the foil laminate during welding, it is preferable that the insulative tape 29 have a smaller diameter opening than the foil laminate 32. It will occur to one skilled in the art that the shape of the apertures is not of critical importance. Thus, even though circular openings are assumed for discussion purposes, the invention is not so limited.

The inclusion of apertures which expose the tab surface(s) in our design precludes the need for tabs which extend beyond the inside of the package; as a result, insufficient tab strength is no longer an issue. Furthermore, tab-to-tab shorting is precluded since the tabs do not extend beyond the internal portion of the package. In this embodiment, the package layering is symmetric about the tab members. Thus, apertures 60 and 62, which are counterparts to apertures 50 and 52, expose the opposing side of tab member 28. This structure is preferred in instances in which resistance welding is to be used, since resistance welding often requires simultaneous contact with both the top and bottom surfaces of the tab member 28.

Figure 3:
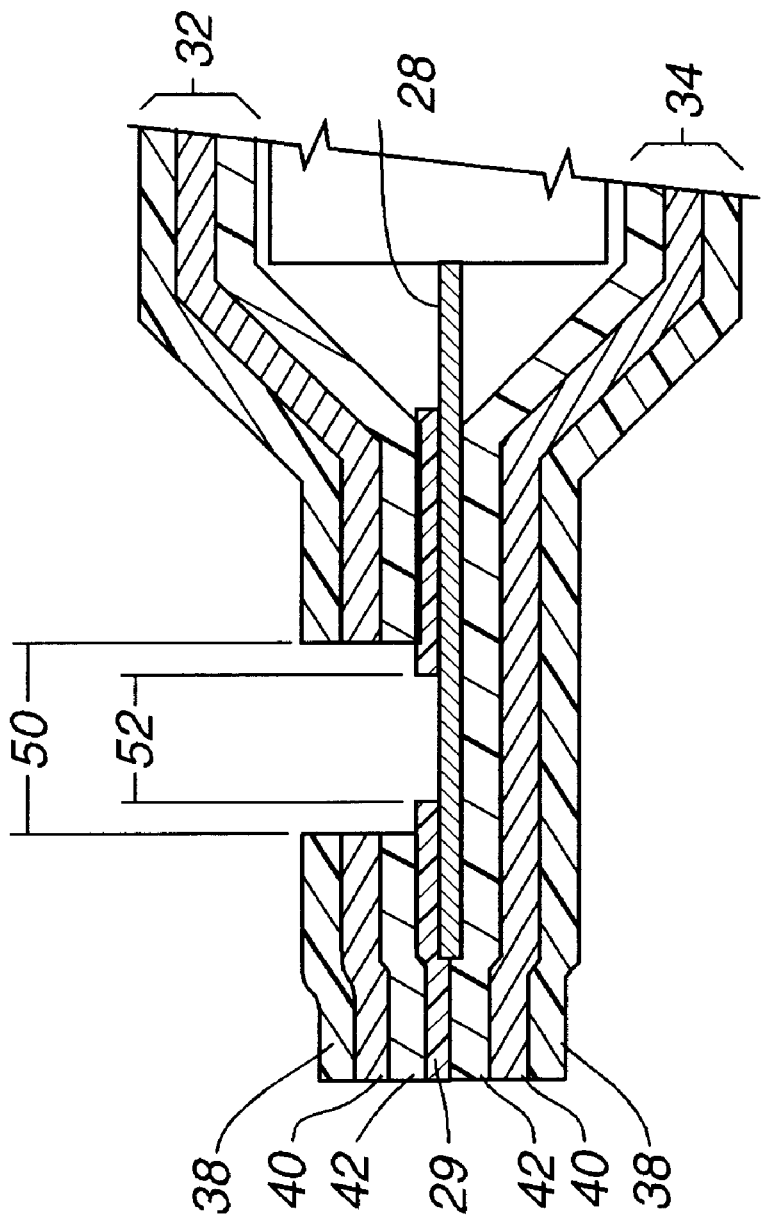
FIG. 3 is a partial section view of an electrochemical cell having an improved tab structure, in accordance with an alternate embodiment of the present invention.

Referring now to FIG. 3, an alternate embodiment of our invention exposes only a single major surface of the tab member 28. This embodiment is preferable in instances in which, for example, either ultrasonic or laser welding of the metal foil package to an external circuit is to be performed. Since only a single side of the tab need be exposed, insulative tape is only required along a single surface of the tab 28, i.e., the surface to be welded to.

Figure 4:
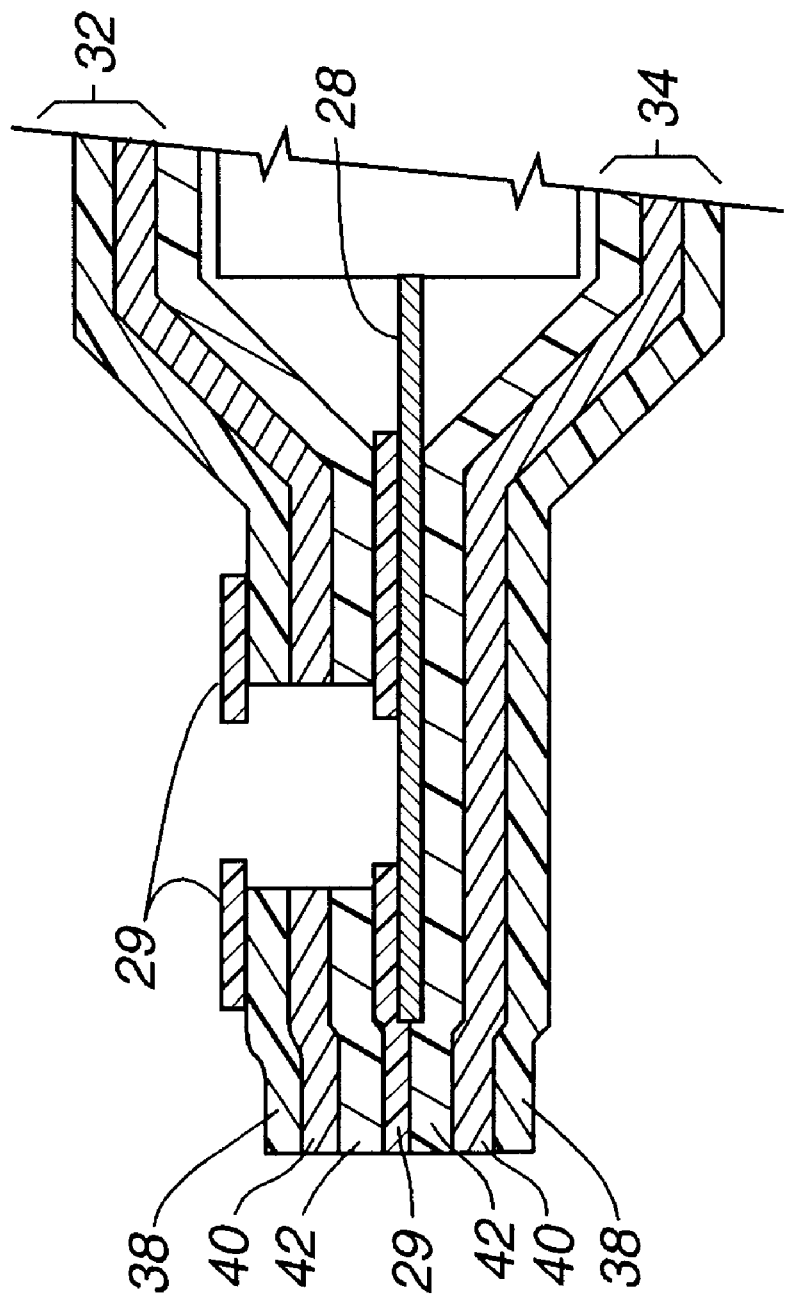
FIG. 4 is a partial section view of an electrochemical cell having an improved tab structure, in accordance with a further embodiment of the present invention.

Referring now to FIG. 4, a further embodiment incorporates a structure which is identical to the structure illustrated in FIG. 3, save for an additional layer of insulative seal tape 29 disposed above outer layer 38. This structure is preferable in instances in which, for example, electrical leads extending from external circuitry are not insulated and, thus, could potentially short to metallic foil layer 40.

An advantage of the present invention is that metal foil laminates can be used to seal a battery cell while avoiding the tab-related issues which have plagued prior art structures. Most notably, tab breakage, due primarily to poor tab strength, has been eliminated without the need to increase tab thickness and without having to provide an additional coating to improve tab strength. Finally, with the tabs fixed apart from each other, tab-to-tab shorting issues have been virtually eliminated.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrochemical cell including an anode, a cathode, a separator, and first and second tab members, said cell being enclosed in a metal foil laminate material, and further including an insulating tape disposed between said tabs and said metal foil laminate wherein said tab members remain enclosed within an interior portion of the metal foil laminate material.

2. An electrochemical cell including an anode, a cathode, a separator, and first and second tab members, said cell being enclosed in a metal foil laminate material, and further including an insulating tape disposed between said tabs and said metal foil laminate further comprising first and second apertures, the first aperture extending through said metal foil laminate material, the second aperture positioned below the first aperture and extending through said insulating tape.

3. An electrochemical cell as described in claim 2, wherein the first and second apertures further comprise concentric apertures having respective first and second diameters, the first diameter being greater than the second diameter.

4. An electrochemical cell enclosed in a metal foil laminate material, comprising:
   an anode, a cathode and a separator; and
   first and second tab members each having opposing upper and lower major surfaces, each major tab surface having a layer of insulating tape disposed thereon, wherein
   a portion of each major surface of each tab member remains exposed through a pair of apertures formed in the insulating tape and the metal foil laminate material.

5. An electrochemical cell as described in claim 4, wherein each pair of apertures further comprise concentric apertures, and each tape aperture has a smaller diameter than the corresponding concentric foil laminate aperture.

6. An electrochemical cell as described in claim 4, wherein said metal foil laminate is a multilayered foil laminate.

7. An electrochemical cell as described in claim 6, wherein at least one of said layers is a heat sealable material.

8. An electrochemical cell enclosed in a metal foil laminate material, comprising:
   an anode, a cathode and a separator;
   first and second tab members each having a major tab surface; and
   first and second layers of insulating tape, the first layer of insulating tape disposed upon the major surface of each tab member, and the second layer of insulating tape disposed upon an outer surface of said foil laminate material, wherein
   apertures formed through the metal foil laminate material and the first and second layers of insulating tape expose a portion of each tab member.

9. An electrochemical cell as described in claim 8, wherein the apertures formed in the first and second layers of tape are smaller than the aperture formed in the metal foil laminate material.

10. An electrochemical cell as described in claim 8, wherein said tab members remain enclosed within an interior portion of the metal foil laminate material.

11. An electrochemical cell as described in claim 8, wherein said metal foil laminate is a multilayered foil laminate.

12. An electrochemical cell as described in claim 8, wherein at least one of said layers is a heat sealable material.

* * * * *